(No Model.) 2 Sheets—Sheet 1.
W. S. SHOEMAKER.
DUMPING COAL CART.
No. 297,539. Patented Apr. 22, 1884.
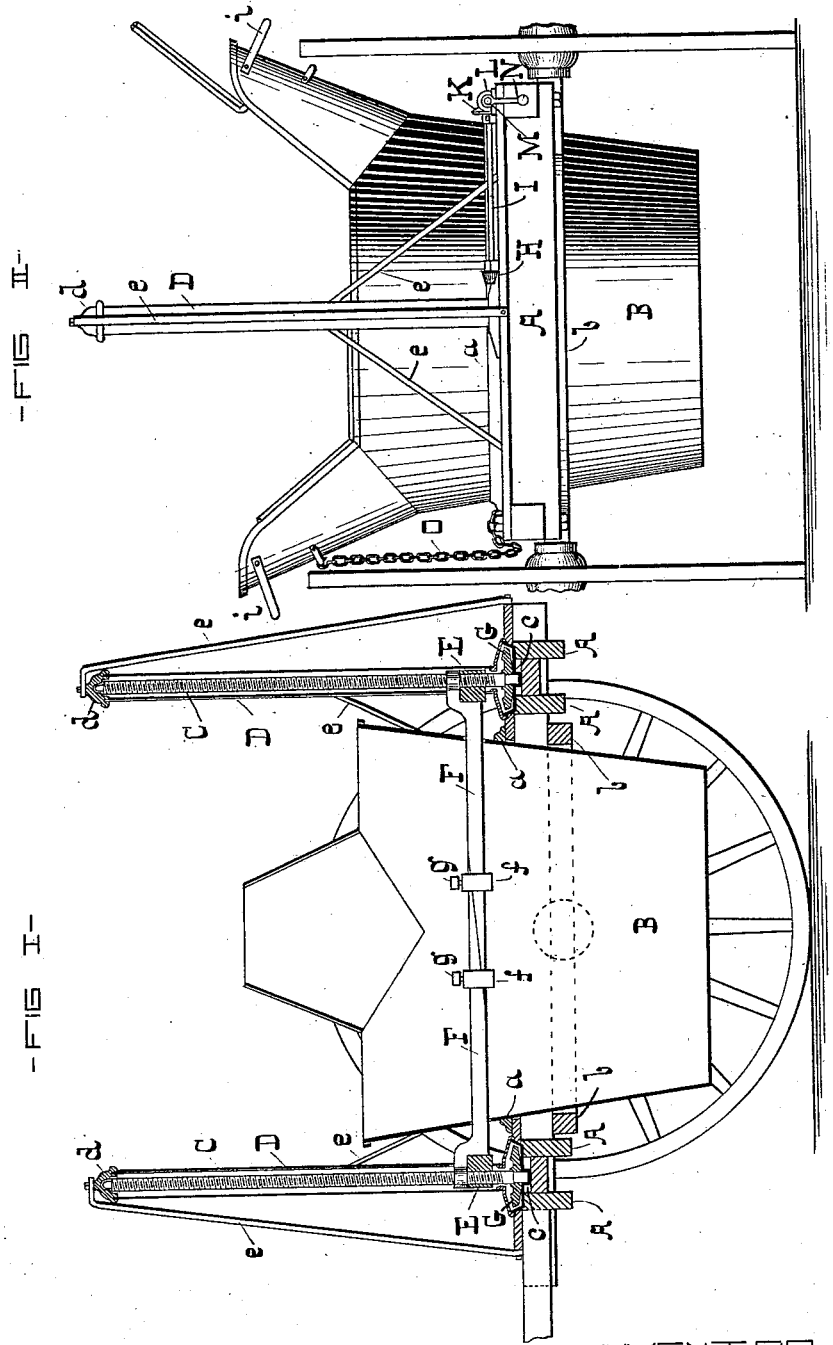
WITNESSES
Danl Fisher
Chas. B. Cassady.
INVENTOR
William S. Shoemaker
by G. H. W. Howard
Attys.

(No Model.) W. S. SHOEMAKER. 2 Sheets—Sheet 2.
DUMPING COAL CART.
No. 297,539. Patented Apr. 22, 1884.
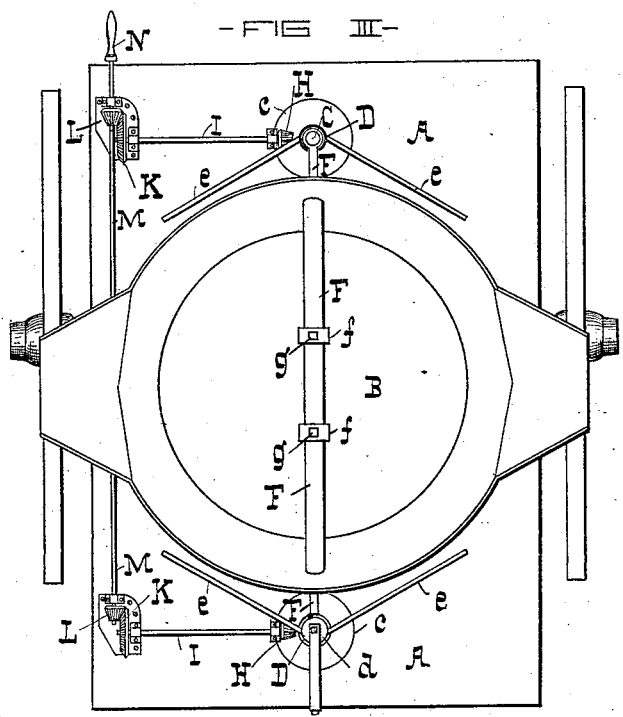
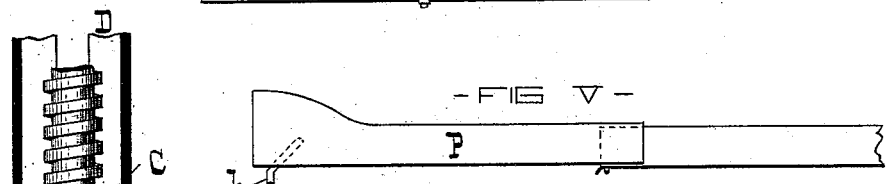
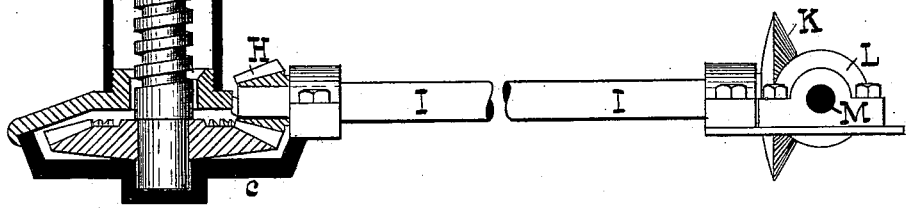
WITNESSES
Danl Fisher
Chas B Cassady
INVENTOR
William S. Shoemaker
by G. H. W. T. Howard,
Attys.

UNITED STATES PATENT OFFICE.

WILLIAM S. SHOEMAKER, OF BALTIMORE, MARYLAND.

DUMPING COAL-CART.

SPECIFICATION forming part of Letters Patent No. 297,539, dated April 22, 1884.

Application filed January 23, 1884. (No model.)

*To all whom it may concern:*

Be it known that I, WILLIAM S. SHOEMAKER, of the city of Baltimore and State of Maryland, have invented certain Improvements in Dumping Coal-Carts, of which the following is a specification.

In the description of my invention reference is had to the accompanying drawings, forming a part hereof, in which—

Figure I is a longitudinal section of my improved dumping coal-cart. Fig. II is an exterior view of the invention as seen from the rear. Fig. III is a plan of the cart. Fig. IV in an enlarged view, partly in section, of a portion of the hoisting devices. Fig. V is a sectional view of a chute which I propose to use with the invention.

A is a wheeled frame or truck, having an opening, practically in the center, in which is supported a removable hopper, B, which extends to near the ground. By this construction the center of gravity of the coal-cart is lowered to its farthest extent. The means for supporting the hopper is a flange, $a$, secured to the said hopper, and which rests on the frame. To admit the passage of the hopper through the wheeled frame the axle $b$ of the cart has an annular center, as shown in the drawings.

The means for elevating the hopper consists as follows:

C C are vertical screws situated in slotted tubes D, which serve as supports, guards, and protection-coverings for them. The lower ends of the screws C rest in stationary depressed plates $c$, and their upper ends are sustained in caps, $d$, on the top of the tubes D. The tubes D are supported in a vertical position by means of diagonal braces $e$.

E E are nuts on the screws C, and F is a bar, the ends of which pass loosely over the screws C and rest on the nuts E. The bar F, which extends loosely through the hopper B and supports it in position, is made in two sections, to allow of its being placed in position, and the two parts are united by means of collars $f$ and set-screws $g$. The lower ends of the screws C are provided with beveled gears G.

H H are beveled pinions in gear with the wheels G, and I I are connecting-shafts, to which the pinions H H are fastened. The two connecting-shafts have beveled gears K K, and these gears are operated through the medium of pinions L L on a third shaft, M, having a crank, N, by means of which it is operated by hand.

The bearing-boxes for the various shafts are of the ordinary kind, and need no description herein.

To elevate the hopper it is only necessary to revolve the screws C in the proper direction through the medium of the crank N, and the hopper is then carried up by means of the nuts E and the bar F. In order to dump the hopper, I provide the same with two chains, O, either of which may be disconnected at pleasure. As the hopper B ascends, the connected chain O holds down the spout of the hopper, and the same is made to gradually change its position from a vertical to such an inclined one as will admit of the discharge of its contents. As the hopper descends, it assumes its original erect position. The hopper B has a cover consisting of two independently-hinged lids, which meet at the center, and each lid has a central hinge to admit of its being folded. The lids are only open when the hopper is being filled, and when they are closed in dumping they prevent the coal discharging too rapidly.

P is a sectional chute, having a hook, $h$, at its larger end adapted to fit into a loop, $i$, at the end of either spout of the hopper B.

I claim as my invention—

1. In a dumping coal-cart, a wheeled frame with an opening therein, a hopper located within and projecting through the said wheeled frame, combined with screws to elevate the said hopper, substantially as described.

2. In a dumping coal-cart, a wheeled frame having an opening therein, a hopper suspended within the said opening, a flange on the hopper to limit its depression within the said opening, and means to elevate the said hopper, all combined substantially as specified.

3. As means for elevating the hopper of a dumping coal-cart, a pair of vertical screws, nuts on the said screws, a bar which passes loosely through the hopper, with its ends resting on the said nuts, and means to revolve the said screws, all combined substantially as specified.

4. In combination with the screws C, nuts E, and the box F, the slotted tubes D, having bearings for the upper ends of the said screws, substantially as specified.

WILLIAM S. SHOEMAKER.

Witnesses:
WM. T. HOWARD,
CHAS. B. CASSADY.